US011203241B2

(12) United States Patent
Fink et al.

(10) Patent No.: US 11,203,241 B2
(45) Date of Patent: Dec. 21, 2021

(54) CHASSIS FOR A UTILITY VEHICLE

(71) Applicant: BPW Bergische Achsen KG, Wiehl (DE)

(72) Inventors: Kira Fink, Wiehl (DE); Heinrich Picker, Hückeswagen (DE); Manfred Michels, Cologne (DE)

(73) Assignee: BPW Bergische Achsen KG, Wiehl (DE)

( * ) Notice: Subject to any disclaimer, the term of this patent is extended or adjusted under 35 U.S.C. 154(b) by 646 days.

(21) Appl. No.: 16/076,120

(22) PCT Filed: Feb. 1, 2017

(86) PCT No.: PCT/DE2017/100065
§ 371 (c)(1),
(2) Date: Aug. 7, 2018

(87) PCT Pub. No.: WO2017/137034
PCT Pub. Date: Aug. 17, 2017

(65) Prior Publication Data
US 2021/0188029 A1 Jun. 24, 2021

(30) Foreign Application Priority Data
Feb. 10, 2016 (DE) ...................... 10 2016 102 289.6

(51) Int. Cl.
*B60G 9/00* (2006.01)
*B60G 7/00* (2006.01)
*F16B 2/00* (2006.01)

(52) U.S. Cl.
CPC ............. *B60G 9/003* (2013.01); *B60G 7/008* (2013.01); *F16B 2/005* (2013.01);
(Continued)

(58) Field of Classification Search
CPC ......... F16D 65/02; B60G 9/003; B60G 7/008; B60G 2200/31; B60G 2204/148; B60G 2204/4306; F16B 2/005
See application file for complete search history.

(56) References Cited

U.S. PATENT DOCUMENTS 3,913,937 A  10/1975 Longworth et al.
6,241,266 B1 * 6/2001 Smith ..................... B60B 35/04
                                                    280/124.116
(Continued)

FOREIGN PATENT DOCUMENTS

DE       101 18 696       10/2002
DE    10 2005 031 753      1/2007
(Continued)

OTHER PUBLICATIONS

Machine Translation of DE 10118696 from Espacenet (Year: 2002).*
(Continued)

*Primary Examiner* — Paul N Dickson
*Assistant Examiner* — Daniel M. Keck
(74) *Attorney, Agent, or Firm* — Gudrun E. Huckett

(57) ABSTRACT

The invention relates to a chassis for a utility vehicle, having a first ᴶ chassis element extending transversely with respect to the vehicle longitudinal direction and a second chassis element (5) fixed to the outer side thereof, wherein the second chassis element (5) is supported against the outer side of the first chassis element via at least one roughened supporting area (11, 12). In order to avoid relative movements between the chassis elements connected by clamping forces in a utility vehicle chassis, the roughening comprises a surface structure produced by machining the supporting area (11, 12) in a blasting process and preferably a laser beam process. The invention further relates to specific
(Continued)

individual parts of such a chassis, specifically an axle shell, an axle guide (5), and a brake carrier.

19 Claims, 7 Drawing Sheets

(52) U.S. Cl.
CPC .... *B60G 2200/31* (2013.01); *B60G 2204/148* (2013.01); *B60G 2204/4306* (2013.01)

(56) References Cited

U.S. PATENT DOCUMENTS

| | | | | |
|---|---|---|---|---|
| 7,954,833 | B1* | 6/2011 | Heath | B60G 9/003 |
| | | | | 280/124.116 |
| 2009/0212523 | A1 | 8/2009 | Koschinat | |
| 2015/0145228 | A1* | 5/2015 | Hock | B60B 35/02 |
| | | | | 280/124.116 |

FOREIGN PATENT DOCUMENTS

| | | | |
|---|---|---|---|
| DE | 10 2005 038 275 | 2/2007 | |
| DE | 10 2013 003 300 | 8/2014 | |
| DE | 10 2014 008 408 | 12/2015 | |
| EP | 2 355 988 | 5/2013 | |
| EP | 3702180 A1 * | 9/2020 | ............ B60G 9/003 |
| WO | 2011/146163 | 11/2011 | |

OTHER PUBLICATIONS

Machine Translation of DE 102005031753 from Espacenet (Year: 2007).*

Machine Translation of DE 102013003300 from Espacenet (Year: 2014).*

Machine Translation of WO 2010/066232 A1 (corresponding document to DE 2355988, which did not have an available translation) from Espacenet (Year: 2013).*

Dunn A. et al.: Nanosecond laser texturing for high friction applications; Optics and Lasers in Engineering; 62 (2014) 9-16; Amsterdam, The Netherlands.

* cited by examiner

CHASSIS FOR A UTILITY VEHICLE

BACKGROUND OF THE INVENTION

The invention relates to a chassis for a utility vehicle having a first chassis element which extends transversely to the longitudinal vehicle direction and a second chassis element which is fixed to the outer side thereof, wherein the second chassis element is supported against the outer side of the first chassis element via at least one roughened support region.

The invention further relates to specific individual components which are used in such a chassis, that is to say, an axle shell for arrangement between an axle member and an axle link, an axle link for guiding an axle member and a brake carrier of a utility vehicle brake.

In the technical field of utility vehicle chassis, there are known connections between a first element of the utility vehicle chassis which extends transversely to the longitudinal vehicle direction and a second element of the chassis which is fixed to the outer side thereof, for example, from EP 2 355 988 B1, WO 2011/146163 A and DE 10 2014 008 408 A1. These publications each describe the connection between an axle member and the axle links or longitudinal links of the utility vehicle chassis which are used to guide the axle member. The outer chassis element, that is to say, the surrounding chassis element, is provided with a roughened surface structure. This structure is constructed to become embedded in the outer side of the inner chassis element, in this instance therefore the axle member, in order thus to achieve an improved connection of the chassis components.

DE 10 2013 003 300 A1 discloses an axle suspension for utility vehicles in which the fixing of the axle member which is constructed as a square pipe is brought about only by clamping, wherein the axle member is clamped between a front axle link and a rear axle link portion which receives a pneumatic spring. In order to transmit the clamping forces, the axle link is provided at the rear end thereof with a shell which extends over a partial periphery of the axle member and which is supported against it. This support is carried out only by means of individual strip-like support regions which are constructed internally on the shell and which extend primarily in the longitudinal direction of the axle member. No significant contact takes place between the axle link and the axle member in the remaining regions of the shells.

The construction type according to DE 10 2013 003 300 A1 has been found to be generally advantageous for the clamping connection between an axle link and an axle member because a given basic resilience of the connection is obtained. However, there may be produced relative movements of the chassis components involved which under some circumstances may lead to an offset in the longitudinal direction of the axle member or in a peripheral direction of the axle member. Such an offset and in particular an offset which is permanently produced is undesirable in the chassis components of a utility vehicle chassis.

Therefore, an object of the invention is to prevent relative movements between the chassis components which are connected by clamping forces in a utility vehicle chassis.

SUMMARY OF THE INVENTION

This object is achieved by a chassis that is characterized in that the roughening comprises a surface structure which is produced by processing the support region with a beam method, an axle shell that is characterized in that the inner side is provided with at least one roughened support region and in that the roughening comprises a surface structure which is produced by processing the support region using a beam method, an axle link that is characterized in that the shell is provided at the inner side thereof with at least one roughened support region and in that the roughening comprises a surface structure which is produced by processing the support region with a beam method, and a brake carrier that is characterized in that the shell is provided at the inner side with at least one roughened support region and in that the roughening comprises a surface structure which is produced by processing the support region using the beam method.

It has been found that a particularly secure arrangement in the zones of direct contact between the support region which is internally constructed on the second chassis element and the outer side and therefore surface of the first chassis element is produced by the surface structure which is produced with a beam method.

The surface structure which is produced by the beam method, that is to say, an electron beam processing operation or a laser beam processing operation, has a greater hardness than the starting material and in particular a surface hardness as a result of which the projecting tips of the surface structure produced by the processing operation are embedded in the opposite material. Therefore, in addition to the clamping connection, a positive-locking connection is produced in the microscopic range. This effect is particularly powerful when the surface of the internally arranged, first chassis element does not have a comparably high material hardness.

With the chassis according to the invention, therefore, a reliable transmission of the operating forces from one chassis component to the other is ensured without a permanent, that is to say, long-lasting, offset being produced, whether transversely to the longitudinal direction of the vehicle or in the peripheral axle direction.

In principle, the invention is suitable for all cases of connection of a first chassis element which extends transversely to the longitudinal vehicle direction to a second chassis element which is fixed to the outer side thereof and which may have, for example, a shell which extends over a partial periphery of the first chassis element. The invention is particularly suitable in cases in which

- one of the two chassis elements is an axle member which is provided with an axle journal for supporting a vehicle wheel, preferably an axle tube,
- the other chassis element is an axle link which is pivotably supported on the vehicle chassis of the utility vehicle and which clamps the axle tube, or
- the other chassis element is a shell which is clamped against the axle member and which is a connection element between the axle member and the axle link which is arranged above or below, or
- the other chassis element is a brake carrier which carries a disk or drum brake, or
- one of the two chassis elements is a wheel hub which is rotatably supported on the axle journal of the axle and the other chassis element is a brake disk or brake drum of a disk or drum brake.

The second chassis element which has the roughening preferably comprises a spheroidal cast iron. This material is particularly suitable for the beam processing operation and in particular laser processing because a hardening of the outer material side is produced by the processing. This fulfils the requirement that the peaks formed in this manner are hard enough to become embedded in the opposite less hard material of the surrounded chassis element.

The cast iron material GJS has been found to be particularly suitable for the second chassis element, in particular the one with the designation EN-GJS-600-3. This material which belongs to the group of spheroidal cast materials is distinguished by graphite which is intercalated in a spheroid manner. This material structure causes a high level of strength of the material and has, during structuring with an electron beam or a laser beam, the advantage that the molten material has a very high level of hardness in the region of the structure with tough material properties at the same time.

The spheroidal cast iron material GCS is also suitable.

The group of beam methods which are considered for processing the support regions includes electron beam processing and laser beam processing operations. While the electron beam method operates under reduced pressure with accelerated electrons, a high-energy light beam comprising monochromatic coherent light is produced in the laser beam method. As a result of focusing, an energy density $>10^{\wedge}6$ $W/cm^{-2}$ is produced.

Although there exists a great variety of laser beam sources which differ as a result of wavelengths, pulse powers, energy densities with application potential for laser beam processing, these laser beam sources can be categorized using the medium for producing the beam. In this case, gas lasers, fluid lasers and solid-state lasers can be distinguished from each other.

The construction type of the solid-state laser has been found to be particularly suitable for the method according to the invention of surface structuring in chassis elements. A diode-pulsed high-power laser having a wavelength <1,000 nm and a maximum pulse energy of 80 mJ is preferred.

The laser used for the roughening is, for example, a high-power nanosecond laser. With this highly efficient short pulse laser, so much energy is introduced into the processed surface of the second chassis element in the focal range of the laser beam that the molten material is urged by this pulse and the special roughened surface structure is produced in the support region. At the same time, the material, in a manner caused by the rapid cooling, is hardened in the support region.

In one embodiment of the invention, the second chassis element is an axle shell which has on the inner side thereof which has the roughened support region a curved extent and which is arranged as an independent component between the first chassis element and an axle link which is pivotably supported on the vehicle chassis of the utility vehicle. Preferably, the axle shell also has a curved extent on the outer side thereof facing the axle link.

According to another embodiment, the axle shell is provided with front and rear wheels in the peripheral direction of the bending extent thereof and is provided at the edges with recesses, through which bar-like pulling elements are at least partially guided. Preferably, the recesses have a U-shaped or V-shaped contour for at least partially introducing the bar-like pulling elements.

In another embodiment of the invention, the support region which is roughened by means of the beam method is constructed internally on a shell which is a component of the second chassis element and which extends over a partial periphery of the first chassis element.

According to a first variant, the second chassis element is an axle link which is pivotably supported on the vehicle chassis of the utility vehicle.

According to a second variant, the second chassis element is a brake carrier of a utility vehicle brake, for example, a sliding caliper disk brake.

With one embodiment, it is proposed that the roughened support region extend in a peripheral direction only over a partial periphery of the shell.

With another embodiment, it is proposed that the roughened support region extend in a longitudinal direction of the first chassis element only over a portion of the length of the shell.

According to another embodiment, the support of the second chassis element on the first chassis element is brought about only via at least two support strips which are formed internally on the shell and which are constructed so as to project forward toward the first chassis element and which have a main longitudinal extent in the longitudinal direction of the first chassis element, wherein the support strips are located on different peripheral portions of the shell and are separated from each other by peripheral portions without support strips.

The support strips are provided with the roughened surface structure either over the entire face thereof or only part-faces of the support strips are provided with the roughened surface structure. In the latter case, the support strips are each provided with the roughening in the direction toward the ends of the main longitudinal extent thereof.

According to another embodiment, the first chassis element has a rectangular cross-section with four sides and rounded transitions between the sides, wherein a first support strip is supported only against a first side and a second support strip is supported only against a second adjacent side.

If each support region is constructed as a strip which is formed on the inner side of the shell, it is advantageous if the troughs of the surface structure determined by alternating peaks and troughs primarily form a plane which is nearer the first chassis element than the inner side of the shell. In this manner, the metal contact on the surface regions which are roughened by laser processing is limited and the embedding of the roughened surface structure in the outer side of the inner chassis element is brought about only in these regions as a result of the clamping force.

In order to achieve the above-mentioned object, there is further proposed an axle shell for arrangement between an axle member and an axle link of a utility vehicle axle. The axle shell has an inner side which extends in a curved manner for direct support against the axle member and an outer side which faces the axle link. In this case, the inner side is provided with at least one roughened support region and the roughening comprises a surface structure which is produced by processing the support region using a beam method. With regard to the beam method for processing the support region, reference may be made completely to the above-mentioned descriptions.

One embodiment makes provision for the axle shell also to have a curved extent at the outer side thereof.

Another embodiment makes provision for the axle shell to be provided with front and rear edges in the peripheral direction of the bending extent thereof and to be provided at the edges with recesses, through which bar-like pulling elements are at least partially guided.

In order to achieve the above-mentioned object, there is further proposed an axle link for guiding an axle member of a utility vehicle axle, having a support region for pivotably supporting the axle link with respect to the chassis of the utility vehicle, and having at least one axle connection region for connecting the axle link to the axle member, wherein the axle link in the axle connection region has a shell. The shell is a component of the axle link and is provided at the inner side thereof with at least one roughened support region. The roughening comprises a surface structure which is produced by processing the support region with a beam method. With regard to the beam method for processing the support region, reference may be made completely to the above-mentioned descriptions.

The axle link can be further distinguished by at least two support strips which are arranged so as to project forward on the shell with a main longitudinal extent in the longitudinal direction of the axle member. The support strips are provided with the support regions, wherein the support strips are located at different peripheral portions of the shell and are separated from each other by peripheral portions without support strips.

In order to achieve the above-mentioned object, there is further proposed a brake carrier of a utility vehicle brake having a carrier portion for fixing and/or supporting functional elements of the brake and a fixing portion for the rigid fixing of the brake carrier to an axle element of the utility vehicle, wherein the fixing portion is constructed as a shell having a bent inner side which is constructed for direct abutment against the axle element. In this case, the shell is provided at the inner side with at least one roughened support region. The roughening comprises a surface structure which is produced by processing the support region using a beam method. With regard to the beam method for processing the support region, reference may be made completely to the above-mentioned descriptions.

According to a preferred embodiment of the brake carrier, the shell is connected to a counter-shell so as to form a substantially closed ring. This connection may be, for example, a screw fitting.

BRIEF DESCRIPTION OF THE DRAWINGS

Other advantages and details will be appreciated from the following description of embodiments which are illustrated in the drawings, in which.

DESCRIPTION OF PREFERRED EMBODIMENTS

Figure 1:
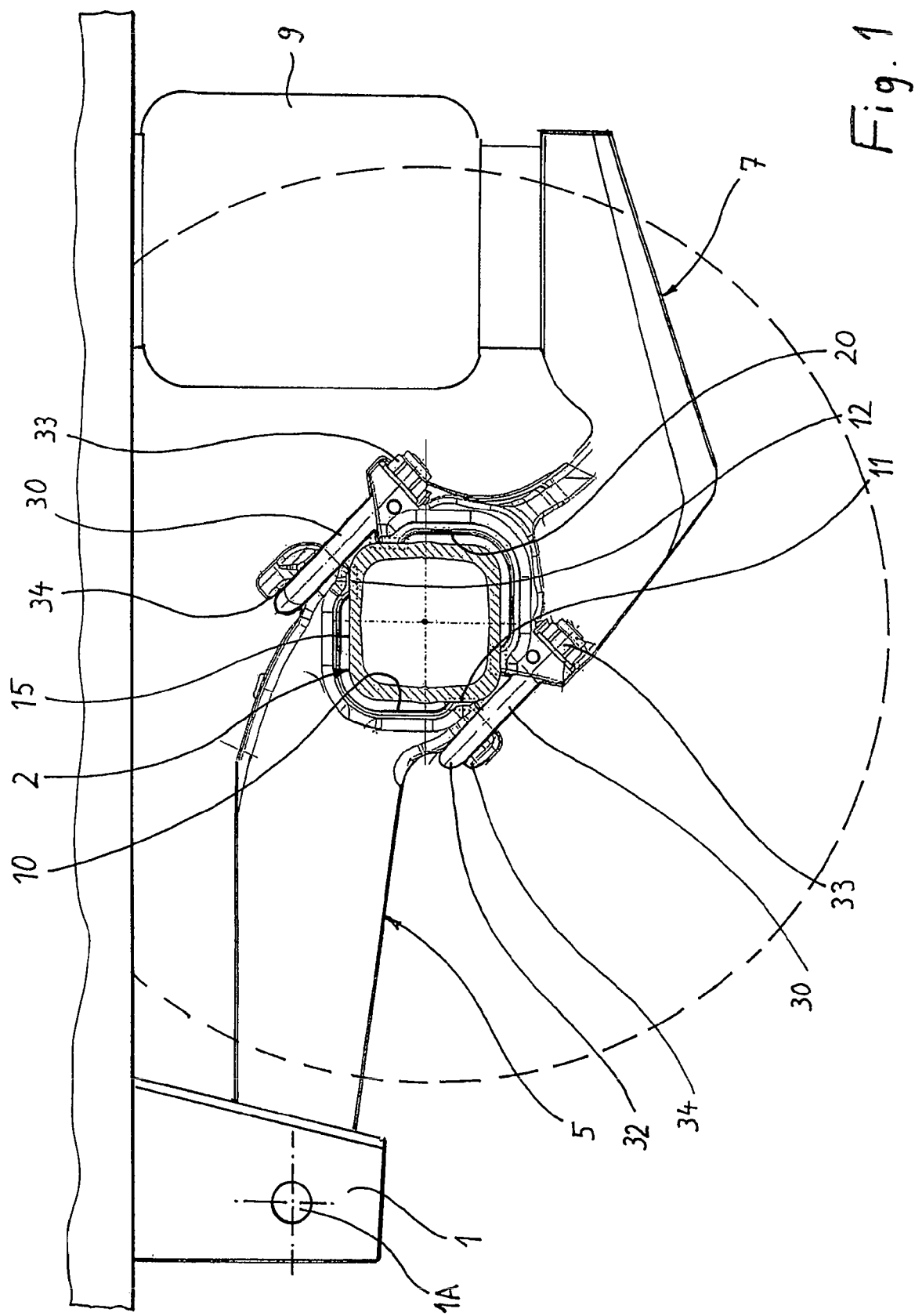
FIG. 1 is a side view of a pneumatically suspended utility vehicle chassis having inter alia an axle link and an axle member which is used to support the vehicle wheels.

The axle suspension described below is used in particular in pneumatically suspended vehicle axles with long, continuous axle members. Such vehicle axles are used in particular in utility vehicles and in particular in truck trailers and semitrailers. The axles are configured for high transport weights and loads for operation on roads.

A link support 1 is fixed at each vehicle side under the vehicle frame of a utility vehicle chassis which is not illustrated in greater detail. This support 1 receives a pivot bearing for the axle suspension. At each vehicle side, an axle link 5 is used to guide the axle member 2 which extends transversely to the longitudinal vehicle direction and which extends rigidly here from one vehicle side as far as the other vehicle side. The axle link 5 has at the front end thereof at 1A a support region having an integrally cast-on link lug which is a component of the pivot bearing in the link support 1 in order to retain the axle link 5 by means of a bolt in a vertically pivotable manner on the link support 1 which is fixed to the chassis.

The axle link is provided with a support face for a pneumatic spring 9 at the rear in the travel direction. The pneumatic spring 9 is supported with an upper closure plate from below against the vehicle frame.

In order to fix the pneumatic spring 9 at the axle side, the axle link 5 is extended beyond the axle member 2 by an additional rear axle link portion 7. Therefore, the axle link 5 is generally constructed in two pieces and it is composed of the axle link at the front in the travel direction and the additional axle link portion 7 which is at the rear in the travel direction and at which the support face for the pneumatic spring 9 is located. During the assembly of the chassis, the front portion of the axle link 5 and the axle link portion 7 are connected to each other and to the axle member 2 via clamping forces. The front portion of the axle link 5 extends in this case from the bearing lug 1A of the pivot bearing in the support 1 as far as the axle member 2.

The two-piece nature of the axle link is advantageous because by selecting the length, on the one hand, of the axle link 5 and, on the other hand, of the rear axle member portion 7, the vehicle-specific spacings can be produced between the pivot bearing, the axle member 2 and the pneumatic spring 9 individually, that is to say, in a customer-specific manner.

The axle link 5 comprises cast metal and preferably a spheroidal cast iron, in particular the material spheroidal graphite cast iron GCS. The rear axle link portion 7 also comprises cast metal and preferably a spheroidal cast iron, in particular the material spheroidal graphite cast iron GCS.

The cast iron material GJS has also been found to be particularly suitable and here in particular the material designated EN-GJS-600-3. This material, which belongs to the group of spheroidal cast materials, is distinguished by graphite which is intercalated in a spheroidal manner. This material structure causes a high level of strength of the material and has the advantage in the case of surface structuring by means of a solid-state laser that the re-molten material has a very high level of hardness in the region of the structure with, at the same time, tough material properties.

The axle member 2 is provided at the outer vehicle end thereof with an axle journal 8 for supporting a vehicle wheel.

Preferably, the axle member is constructed as an elongate axle tube. In this case, it is provided with axle journals for supporting the wheel hubs with the vehicle wheels which are fixed thereto at the two ends thereof. Here, the axle tube generally has a rectangular cross-section with four sides and rounded transitions between the sides. The axle tube can comprise, for example, two U-profiles which are longitudinally welded to each other. The outer side 15 thereof is not processed. In particular, it is not synthetically roughened.

In order to clamp the axle member 2 between the axle link 5 and the rear axle link portion 7, the axle link 5 is provided with a shell 10 which is wider than the axle link 5. The axle link portion 7 is also provided with a shell 20 which is wider than this axle link portion. The shells 10, 20 are an integral component of the axle link 5 or the axle link portion 7.

For an optimum force path in the region of the axle connection, the cast construction is such that the axle link 5 strikes the shell 10 thereof obliquely downward and the axle link portion 7 strikes the shell 20 thereof obliquely upward.

The two shells 10, 20 extend along the axle member 2. They have at the inner side thereof facing the axle member 2 a first inner side portion and a second inner side portion which forms a corner angle of approximately 90° together with the first inner side portion. The support of the axle link 5 and the axle link portion 7 against the non-processed outer side 15 of the axle member 2 is not carried out over the whole face of the inner side but instead only in the edge zone of the respective inner side portion, which edge zone faces away from the corner angle. In this edge zone, a projection which extends primarily in the longitudinal extent of the axle member 2 in the form of a support strip 10A is constructed at each of the two inner side portions of the shell 10 and the shell 20. The strip forms a support region 11, 12, 13, 14. The contact between one chassis element, that is to say, the axle member 2, and the other chassis element, that is to say, the axle link 5, is produced only at this support region 11, 12, 13, 14 and therefore only at the support strip 10A, or between the axle member 2 and the rear axle member portion 7.

The support regions 11, 12, 13, 14 are located at different peripheral portions of the shells 10, 20 and are in particular separated from each other by peripheral portions without support regions. The result of this construction of the shells 10, 20 is only partial contact between the axle link 5 and the axle member 2 or between the axle link portion 7 and the axle member 2 at locations where the support strips 10A with the support regions are located. However, great regions of the inner side of the two shells 10, 20 are not involved in this contact.

FIG. 1 shows that, since the axle member 2 has a rectangular cross-section with four sides and rounded transitions between the sides, the first support region 11 of the axle link 5 is supported only against a first side, and the second support region 12 of the axle link 5 is supported only against a second side of the axle member 2, wherein these two sides of the axle member 2 are adjacent to each other. Similarly, the axle link portion 7 illustrated in FIG. 3 is supported with a first support region 13 only against a third side and with a second support region 14 only against a fourth side of the axle member 2, wherein these third and fourth sides of the axle member 2 are also adjacent to each other.

Figure 2:
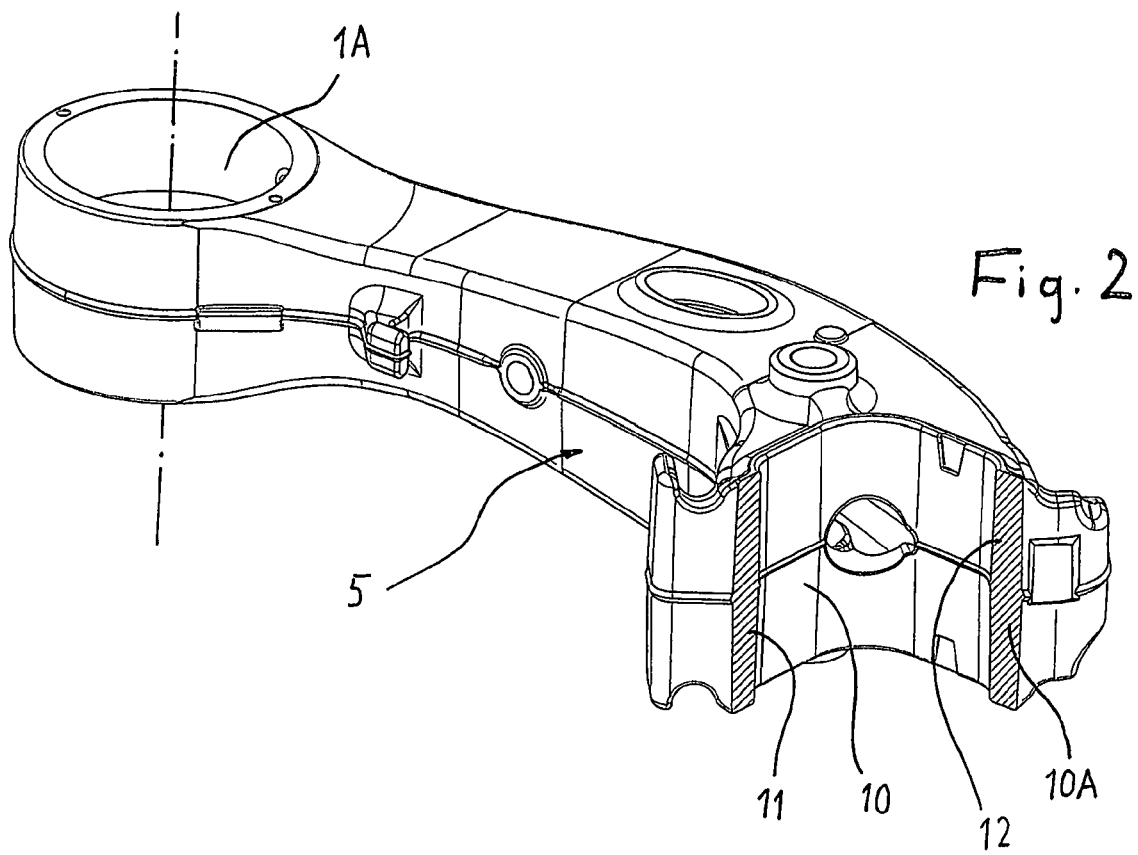
FIG. 2 is a perspective view of only the axle link.
Figure 3:
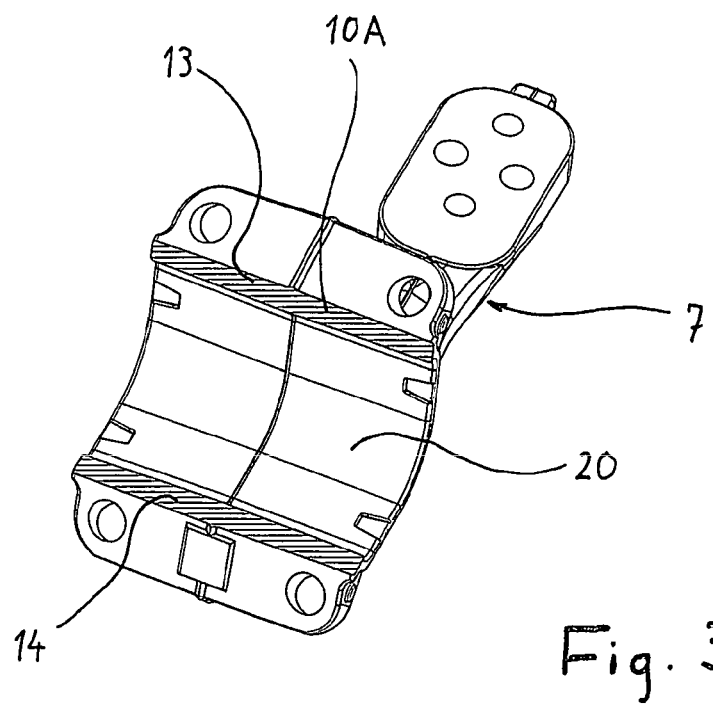
FIG. 3 is a perspective view of only an axle link portion, which is used to fix the pneumatic spring of the pneumatically suspended vehicle axle.

According to FIG. 2 and FIG. 3, the support regions 11, 12 which are formed on the axle link 5 in a strip-like manner and also the support regions 13, 14 which are formed on the axle link portion 7 in a strip-like manner are provided with a surface structure which is roughened by selective laser processing of these faces. In FIG. 2 and FIG. 3, the support strips 10A are provided completely, that is to say, over the entire face thereof, with the surface structure which is roughened in this manner.

Figure 4:
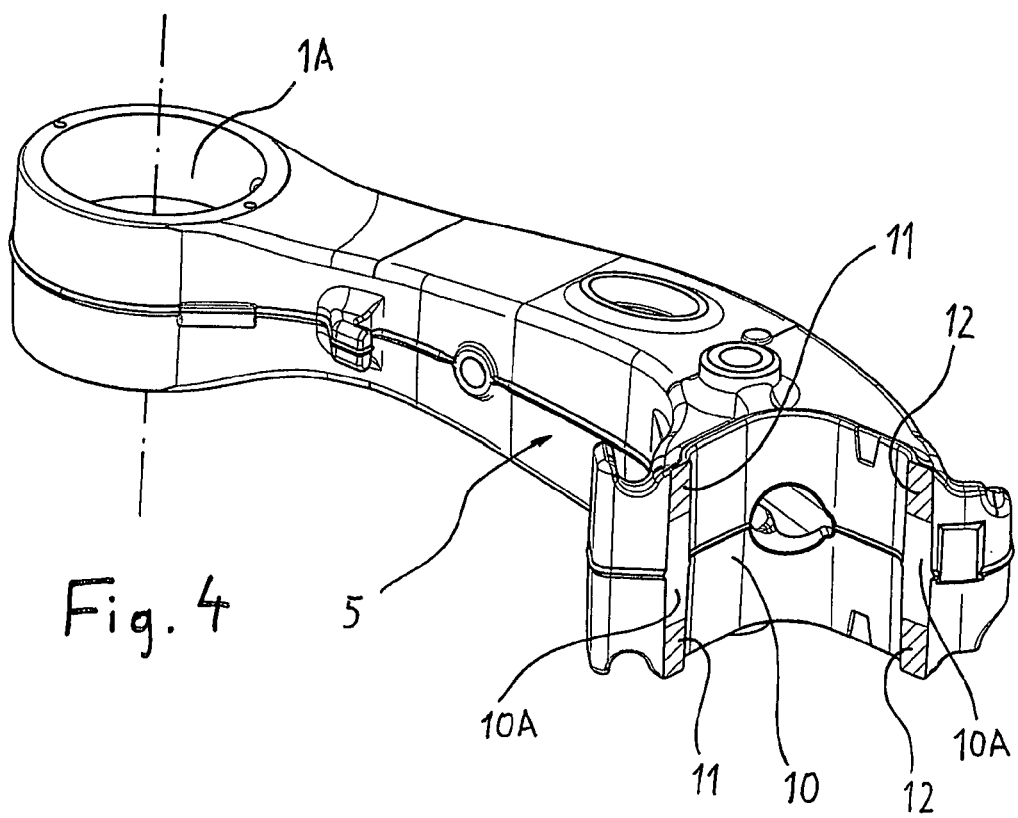
FIG. 4 is a perspective view in a second embodiment of only the axle link.
Figure 5:
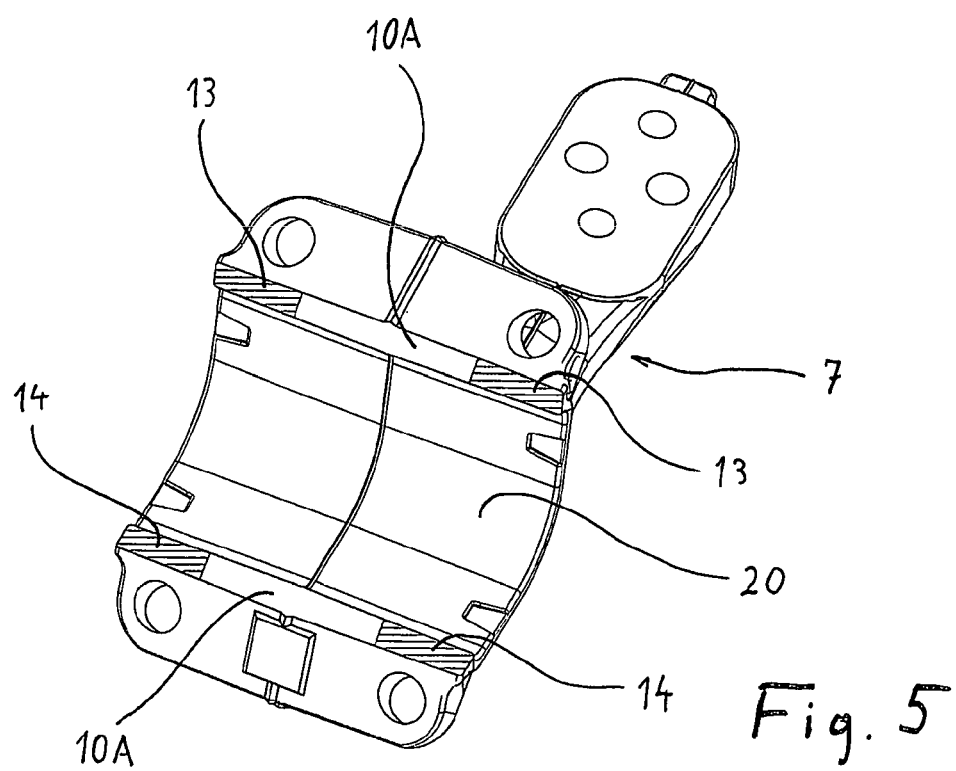
FIG. 5 is a perspective view in the second embodiment of only the axle link portion which is used to fix the pneumatic spring.
Figure 6:
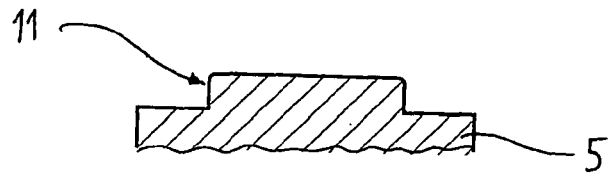
FIG. 6 shows three sections through a contact region which is constructed on the axle link, before the processing, after a pre-processing operation by smoothing the subsequent contact region and after the laser processing of the contact region has been carried out with the result of a substantially roughened surface structure in the contact region.
Figure 6:
Figure 6:
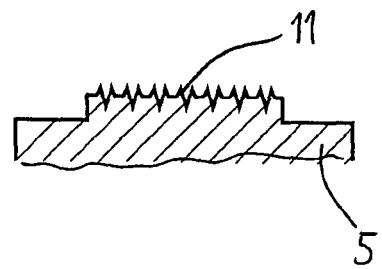

In the other embodiment according to FIG. 4 and FIG. 5, only part-faces 11, 12, 13, 14 of the support strips 10A are provided with the roughened surface structure. Other part-faces of the support strips 10A are without this surface structure, that is to say, these part-regions were not roughened by an electron beam processing operation or laser processing.

If only part-faces are provided with the roughened surface structure, they are the part-faces which are located in the direction toward the two ends of the main longitudinal extent of the support strips, as can be seen in FIGS. 4 and 5.

The processing of the support faces is preferably carried out using a pulsed laser. This has been found to be more advantageous with regard to the material spheroidal cast iron, which the axle link 5 and the link portion 7 thereof comprise, than a continuously operating laser. It is advantageous if the support regions 11, 12, 13, 14 are prepared and smoothed before the laser processing operation by a cutting processing operation, for example, by means of a milling tool. This preparation improves the result of the subsequent laser processing.

During the laser beam processing, the laser can be operated with an advance direction in the longitudinal direction of the shells 10, 20 or with an advance direction transverse to the longitudinal direction of the shells 10, 20. A beam processing operation initially in one advance direction and then in the advance direction arranged transversely thereto is also possible.

The clamping connection of the axle member 2 between the axle link 5 and the axle link portion 7 is carried out by tightening bar-like pulling elements 30 which clamp one shell 10 against the other shell 20 with the fixing portion of the axle member 2 being interposed. This clamping is carried out at an oblique angle relative to the horizontal.

Two threaded curved members each comprising a bent curved member portion 32 and two mutually parallel portions which are straight in a bar-like manner and which transmit the tensile force as the actual pulling elements are used as pulling elements 30. At the free ends thereof, the bar-like portions are provided with outer threads, onto which a threaded nut 33 which is supported at the outer side on the shell 20 is screwed.

The curved member portion 32 of each threaded curved member is guided around an abutment 34 which is formed on the axle link 5. The abutment 34 is a projection which is integrally formed on the axle link 5 and which is provided with a groove which corresponds to the curvature of the curved member portion 32.

As a result of the arrangement of the threaded curved member transversely to the axle tube 2, it is possible for the bar-like pulling elements 30 to extend in the region of the axle connection substantially along the extent of the axle link 5 and axle link portion 7 and for the ends of the pulling elements to extend backward and obliquely downward with the threaded nuts 33 screwed on at that location. As a result of this arrangement, an optimally protected position of the pulling elements 30 and in particular the threaded nuts 33 is achieved.

As a result of the at least partial roughening of the support regions 11, 12, 13, 14 by means of the described beam method, there is produced a permanently secure arrangement in the zones of direct contact between the support regions constructed internally on the axle link 5 and the unprocessed, comparatively smooth outer side 15 of the axle member 2. The same applies to the axle link portion 7. In this manner, a secure transmission of the operating forces is ensured without a continuous offset being produced, that is to say, a constant offset, whether in the longitudinal direction of the axle or in the peripheral axle direction.

Figure 7:
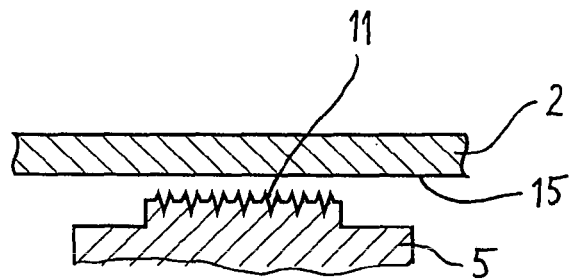
FIG. 7 shows sections in the contact region between the axle link and the axle member before a clamping force is applied and after the complete tightening of the clamping connection.
Figure 7:
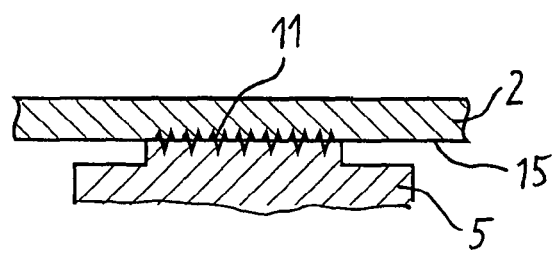
Figure 8:
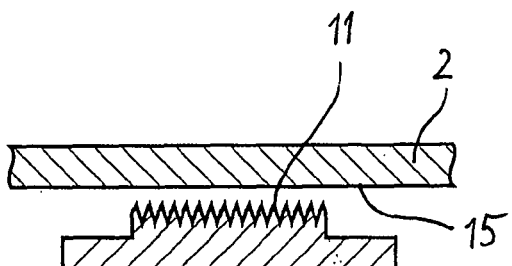
FIG. 8 shows sections in another embodiment in the contact region between the axle link and the axle member, again before a clamping force is applied and after the complete tightening of the clamping connection.
Figure 8:
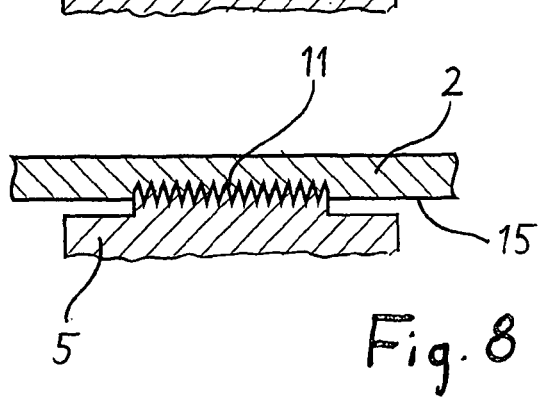

In the fixing method described here, there is produced, as illustrated in FIG. 7 and FIG. 8, by the pulling elements 30 being tightened an embedding of the tips of the surface structure which is roughened and hardened by the beam processing in the unprocessed and therefore comparatively smoother outer side of the axle member 2. The contact brought about in this manner takes place only at the support regions 11, 12, 13, 14 not outside the support regions.

Figure 9:
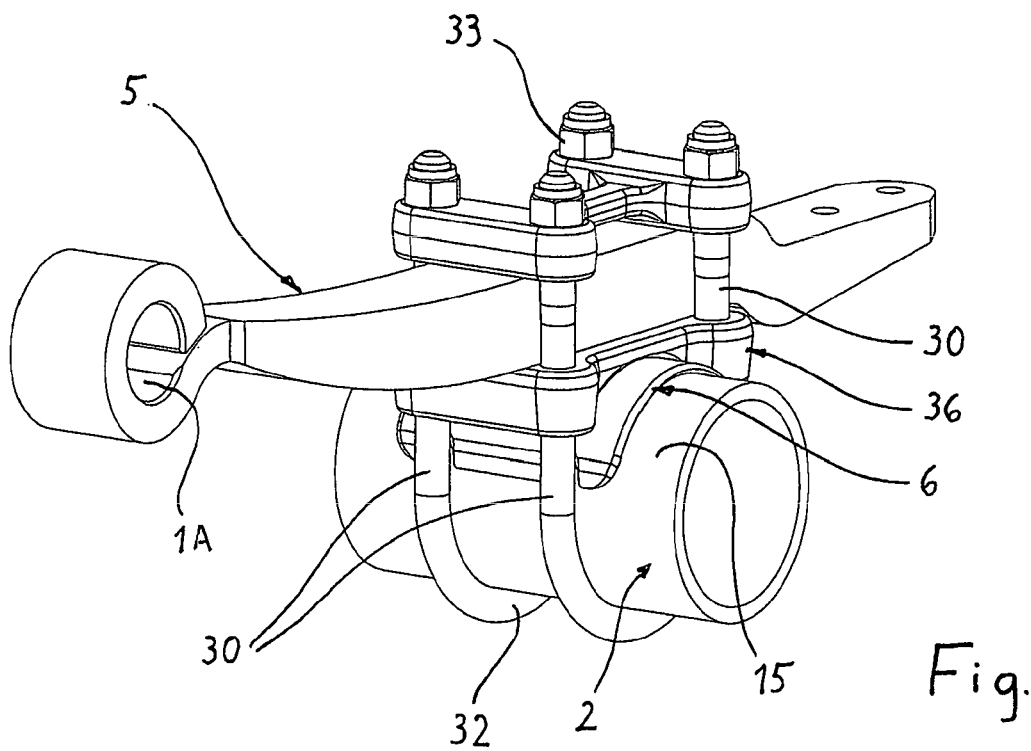
FIG. 9 is a perspective view of another embodiment of an axle suspension with a pneumatically suspended utility vehicle chassis, wherein only a short axle member portion is reproduced of the axle member.
Figure 10:
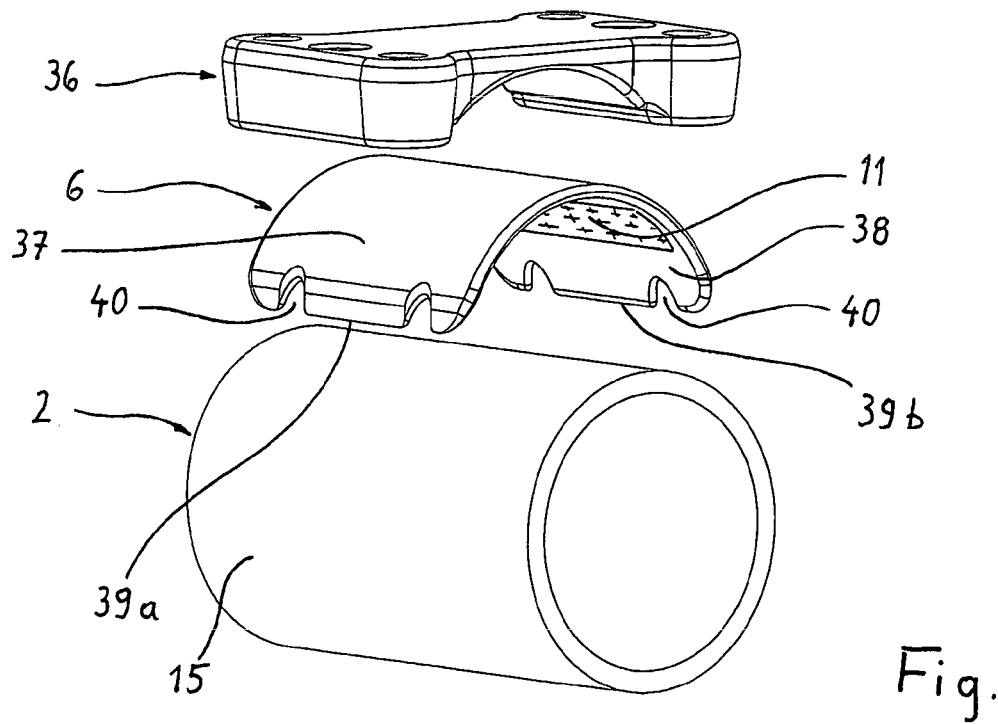
FIG. 10 is an exploded view of individual objects of the axle suspension according to FIG. 9.
Figure 11:
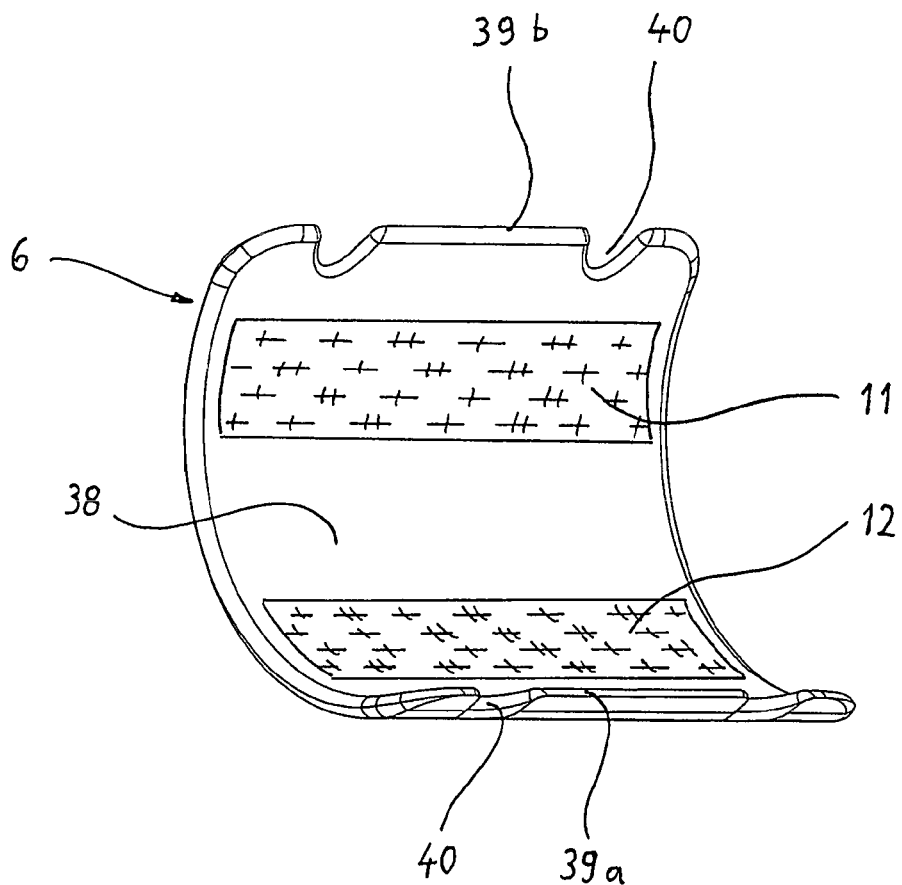
FIG. 11 is a perspective view of only the axle shell of the axle suspension according to FIG. 9.

FIGS. 9-11 depict another embodiment of the axle connection, here in conjunction with an axle member 2 which is constructed as a round tube and of which only a short longitudinal portion is reproduced in FIG. 9. The axle link 5 is not constructed in two pieces in this instance but instead in one piece and it comprises a spring steel here, which imparts a given inherent resilience and deformability to the axle link 5.

There are arranged and clamped between the axle link 5 and the axle member 2, arranged transversely relative thereto, two chassis elements, that is to say, a bent axle shell 6 and an axle pad 36 which is constructed as a formed cast member or forged component. The axle pad 36 abuts the axle link 5 from below in the assembled axle connection, as illustrated in FIG. 9. The lower side of the axle pad 36 is constructed in a shell-like manner, wherein the shell contour is identical or practically identical to the outer side 37 of the axle shell 6. The inner side 38 of the axle shell 6 also has the curved extent and it is identical or practically identical to the outer contour of the round axle member 2. The axle shell 6 therefore surrounds with the curved inner side 38 thereof the axle member 2 over a portion of the periphery thereof and at a maximum over half of the periphery of the axle member 2.

The chassis portions mentioned are tensioned against each other and therefore clamped by means of two threaded curved members. In particular, there is produced a clamping of the bent axle shell 6 with the axle member 2. The axle shell 6 is provided at the inner side 38 with the roughened support regions 11, 12 for an improved connection between the inner side 38 of the axle shell 6 and the outer side 15 of the axle member 2, wherein the roughening by the processing of the support regions 11, 12 in the already-described beam method above is achieved. Therefore, the axle shell 6 comprises one of the spheroidal cast iron materials already set out above.

The axle shell 6 is provided with recesses 40 at the edges 39a, 39b which are at the front and rear in the peripheral direction of the bending extent of the axle shell and which extend along the axle member 2. The bar-like pulling elements 30 of the threaded curved members extend at least partially through the recesses 40. The axle shell 6 is thereby fixed in the longitudinal direction of the axle member to the pulling elements and therefore also with respect to the axle link 5. The axle shell 6 is therefore capable of taking up forces in the longitudinal direction of the axle member and to transmit them to the axle link 5. An offset of the axle member in this longitudinal direction is also prevented in the case of longer use.

The four recesses 40 at the axle shell 6 are for guiding the bar-like pulling elements 30 of U-shaped or V-shaped contour through with little play.

Figure 12:
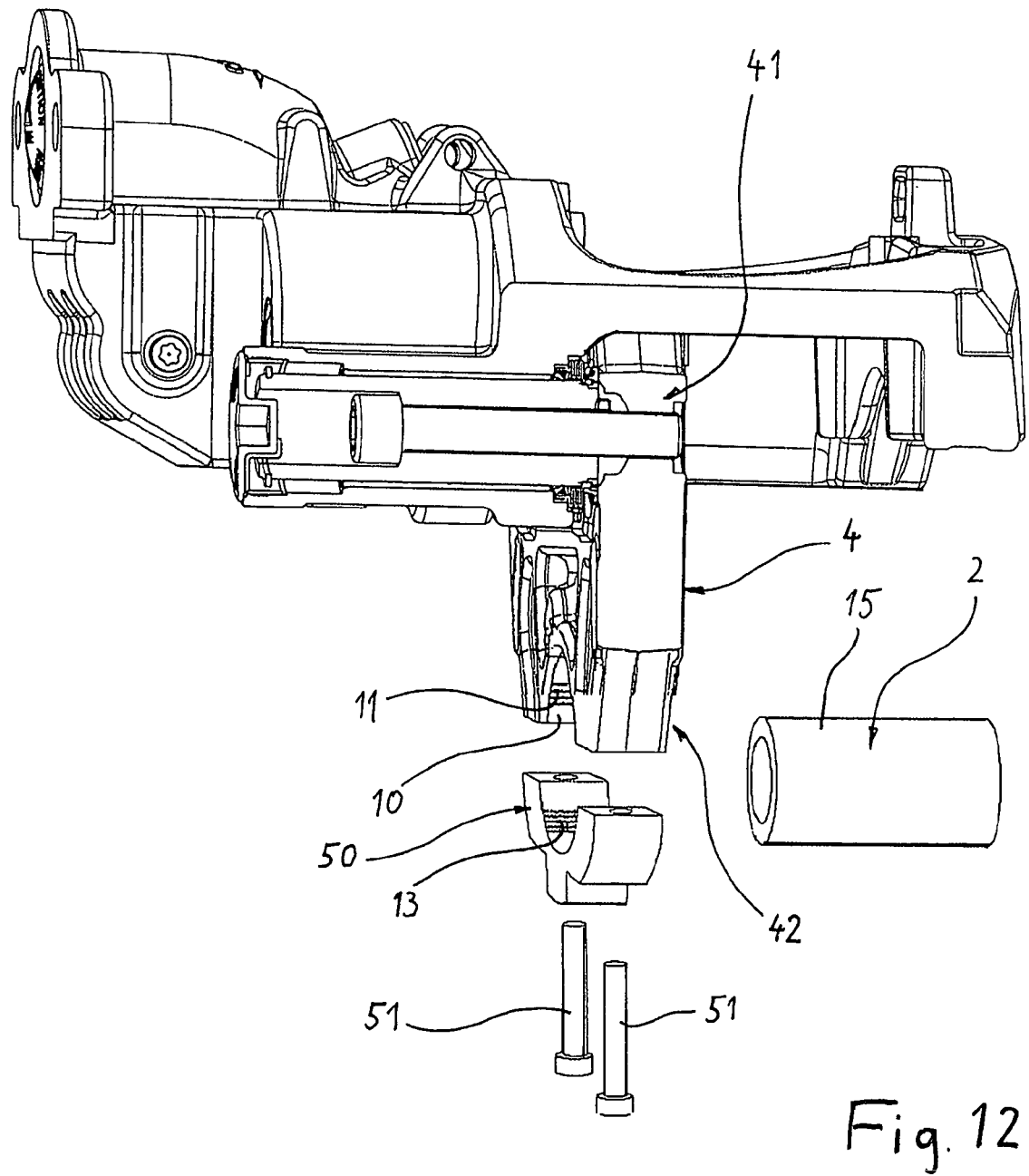
FIG. 12 is a perspective view of the disk brake of the chassis, the brake carrier of which can be fixed by clamping on the axle member which is constructed here as a round tube, wherein the chassis elements involved are reproduced in the non-assembled state.

FIG. 12 illustrates another embodiment of the utility vehicle chassis. The first chassis element is again the axle element, here with the cross-section of a round axle tube. However, the second chassis element in this case is the brake carrier 4 of the utility vehicle disk brake.

The brake carrier 4 has a carrier portion 41 for fixing and/or supporting functional elements of a disk brake, for example, for fixing and supporting the brake caliper of the disk brake. Furthermore, the brake carrier has a fixing portion 42 for the rigid fixing of the brake carrier 4 to the axle element. In this case, this fixing portion 42 is the bent shell 10 which is constructed for abutment directly against the axle element, that is to say, the axle member 2.

The fixing portion 42 which has the shell 10 is connected to a counter-shell 50 to then form a closed ring which clamps the axle element 2, for example, by means of screws 51. At the inner side of the shell 10 and preferably also of the counter-shell 50, the roughened portions are each constructed partially in the form of the support regions 11, 12, 13, 14 which are produced by the beam processing operation.

The brake carrier 4 and preferably also the counter-shell 50 again comprise the already-described spheroidal cast steel, in particular spheroidal graphite cast iron GJS or GCS, which is roughened with the beam method.

LIST OF REFERENCE NUMERALS

1 Link support
1A Bearing lug
2 First chassis element, axle member
4 Second chassis element, brake carrier
5 Second chassis element, axle link
6 Second chassis element, axle shell
7 Axle link portion
9 Pneumatic spring
10 Shell
10A Support strip
11 Support region
12 Support region
13 Support region
14 Support region
15 Outer side of axle member
20 Shell
30 Pulling element, threaded curved member
32 Curved member portion
33 Threaded nut
34 Abutment
36 Axle pad
37 Outer side
38 Inner side
39a Edge
39b Edge
40 Recess
41 Carrier portion
42 Fixing portion
50 Counter-shell
51 Screw

What is claimed is:

1. A chassis for a utility vehicle having a first chassis element (2) which extends transversely to the longitudinal vehicle direction and a second chassis element which is fixed to the outer side thereof (15), wherein the first chassis element (2) is an axle member (2) and wherein the second chassis element is an axle link (5) which is pivotably supported on the vehicle chassis of the utility vehicle, wherein the axle link (5) is supported against the outer side (15) of the axle member (2) via at least one roughened support region (11, 12), characterized in that the roughening comprises a surface structure which is produced by processing the support region (11, 12) by means of a solid-state laser which is pulsed with a pulse energy of a maximum of 80 mJ, wherein the roughened support region (11, 12) is constructed internally on a shell (10) which is a component of the axle link (5) and which extends over a partial periphery of the axle member (2), wherein the support of the axle link (5) on the axle member (2) is brought about only via at least two support strips (10A) which are formed on the shell (10) and which are constructed so as to project forward toward the axle member (2) and which have a main longitudinal extent in the longitudinal direction of the axle member (2), wherein the support strips (10A) are located on different peripheral portions of the shell (10) and are separated from each other by peripheral portions without support strips, wherein the roughened support region (11, 12) extends, viewed in the longitudinal direction of the axle member (2), only over a portion of the length of the shell (10) in the longitudinal direction of the axle member (2).

2. The chassis as claimed in claim 1, characterized in that the axle link (5) comprises a spheroidal cast iron.

3. The chassis as claimed in claim 2, characterized in that the axle link (5) comprises the spheroidal cast iron material GJS or the spheroidal cast iron material GCS.

4. The chassis as claimed in claim 1, characterized in that the roughened support region (11, 12) extends in a peripheral direction only over a partial periphery of the shell (10).

5. The chassis as claimed in claim 1, characterized in that the support strips (10A) are provided with the roughened surface structure over the entire face thereof.

6. The chassis as claimed in claim 1, characterized in that only part-faces of the support strips (10A) are provided with the roughened surface structure.

7. The chassis as claimed in claim 6, characterized in that the support strips (10A) are each provided with the roughened surface structure in the direction toward the ends of the main longitudinal extent thereof.

8. The chassis as claimed in claim 1, characterized in that the axle member (2) has a rectangular cross-section with four sides and rounded transitions between the sides, and in that a first support strip (10A) is supported only against a first side and a second support strip (10A) is supported only against a second adjacent side.

9. The chassis as claimed in claim 1, characterized in that the surface structure of the roughening is determined by alternating peaks and troughs and in that the plane in which the troughs are primarily arranged is nearer the axle member (2) than the inner side of the axle shell (10).

10. An axle shell (6) for arrangement between an axle member and an axle link of a utility vehicle axle, having an inner side (38) which extends in a curved manner for direct support against the axle member and having an outer side (37) which faces the axle link, characterized in that the axle shell (6) has a curved extent at the outer side (37) thereof, in that the inner side (38) is provided with at least one roughened support region (11, 12), and in that the roughening comprises a surface structure which is produced by processing the support region (11, 12) by means of a solid-state laser which is pulsed with a pulse energy of a maximum of 80 mJ, wherein the axle shell (6) is provided with opposed front and rear edges (39a, 39b), viewed in the peripheral direction of the bending extent thereof, and the front and rear edges (39a, 39b) are provided with recesses (40) facing in the peripheral direction, wherein through the recesses (40) U-bolts are at least partially guided.

11. The axle shell as claimed in claim 10, characterized in that the axle shell comprises a spheroidal cast iron.

12. The axle shell as claimed in claim 11, characterized in that the axle shell comprises the spheroidal cast iron material GJS or the spheroidal cast iron material GCS.

13. An axle link (5) for guiding an axle member (2) of a utility vehicle axle, having a support region for pivotably supporting the axle link (5) with respect to the chassis of the utility vehicle, and having at least one axle connection region for connecting the axle link (5) to the axle member (2), wherein the axle link (5) in the axle connection region (2) has a shell (10) which is a component of the axle link (5), characterized in that the shell (10) is provided at the inner side thereof with at least one roughened support region (11, 12) and in that the roughening comprises a surface structure which is produced by processing the support region (11, 12) by means of a solid-state laser which is pulsed with a pulse energy of a maximum of 80 mJ, wherein the axle link (5) has at least two support strips (10A) which are formed on the shell (10) so as to project forward with a main longitudinal extent in the longitudinal direction of the axle member (2) and which are provided with the roughened support regions (11, 12), wherein the support strips (10A) are located at different peripheral portions of the shell (10) and are separated from each other by peripheral portions without support strips, wherein the roughened support region (11, 12) extends, viewed in the longitudinal direction of the axle member (2), only over a portion of the length of the shell (10) in the longitudinal direction of the axle member (2).

14. The axle link as claimed in claim 13, characterized in that the shell (10) comprises a spheroidal cast iron.

15. The axle link as claimed in claim 14, characterized in that the shell (10) comprises the spheroidal cast iron material GJS or the spheroidal cast iron material GCS.

16. A brake carrier (4) of a utility vehicle brake, preferably a disk brake, having a carrier portion (41) for fixing and/or supporting functional elements of the brake and a fixing portion (42) for the rigid fixing of the brake carrier (4) to an axle element of a utility vehicle, wherein the fixing portion (42) is constructed as a shell (10) having a bent inner side which is constructed for direct abutment against the axle element, characterized in that the shell (10) is provided at the inner side with at least one roughened support region (11, 12) and in that the roughening comprises a surface structure which is produced by processing the support region (11, 12) by means of a solid-state laser which is pulsed with a pulse energy of a maximum of 80 mJ.

17. The brake carrier as claimed in claim 16, characterized in that the shell (10) comprises a spheroidal cast iron.

18. The brake carrier as claimed in claim 17, characterized in that the shell (10) comprises the spheroidal cast iron material GJS or the spheroidal cast iron material GCS.

19. The brake carrier as claimed in claim 16, characterized in that the shell (10) is connected to a counter-shell (50) so as to form a substantially closed ring.

* * * * *